United States Patent
Pazhayampallil et al.

(10) Patent No.: US 12,487,347 B2
(45) Date of Patent: Dec. 2, 2025

(54) METHOD FOR CALIBRATING OFFSETS BETWEEN DOPPLER-BASED SENSORS ON A MOBILE PLATFORM

(71) Applicant: BlueSpace.ai, Inc., Santa Clara, CA (US)

(72) Inventors: Joel Pazhayampallil, Santa Clara, CA (US); Jasprit S. Gill, Santa Clara, CA (US)

(73) Assignee: BlueSpace.ai, Inc., Santa Clara, CA (US)

( * ) Notice: Subject to any disclaimer, the term of this patent is extended or adjusted under 35 U.S.C. 154(b) by 440 days.

(21) Appl. No.: 18/091,033

(22) Filed: Dec. 29, 2022

(65) Prior Publication Data

US 2023/0213635 A1   Jul. 6, 2023

Related U.S. Application Data

(60) Provisional application No. 63/295,472, filed on Dec. 30, 2021.

(51) Int. Cl.
  *G01S 7/497*   (2006.01)
  *G01S 7/48*    (2006.01)
  *G01S 17/931*  (2020.01)

(52) U.S. Cl.
  CPC .......... *G01S 7/4972* (2013.01); *G01S 7/4808* (2013.01); *G01S 17/931* (2020.01)

(58) Field of Classification Search
  CPC .......... G01S 17/42; G01S 17/58; G01S 17/87; G01S 17/89; G01S 17/931; G01S 7/497; G01S 7/4808; G01S 7/4972

(Continued)

(56) References Cited

U.S. PATENT DOCUMENTS

| | | |
|---|---|---|
| 9,903,728 B2 | 2/2018 | Powers et al. |
| 11,235,785 B2 | 2/2022 | Pazhayampallil et al. |

(Continued)

FOREIGN PATENT DOCUMENTS

WO    2020035728 A2    2/2020

OTHER PUBLICATIONS

International Search Report and Written Opinion for International Patent Application No. PCT/US2021/019122 mailed on Sep. 14, 2021; 14 pages.

*Primary Examiner* — John H Le
(74) *Attorney, Agent, or Firm* — Run8 Patent Group, LLC; Peter Miller; Brian T. Chew

(57) ABSTRACT

A method includes: deriving a first absolute motion of the first optical sensor based on radial positions, azimuthal positions, radial distances, and radial velocities of points in a first cluster of points representing a first static reference surface in a first frame captured by the first optical sensor; deriving a second absolute motion of the second optical sensor based on radial positions, azimuthal positions, radial distances, and radial velocities of points in a first cluster of points representing a first static reference surface in a second frame captured by the second optical sensor; calculating a rotational offset between the first optical sensor and the second optical sensor based on the first absolute motion and the second absolute motion; and aligning a third frame captured by the first optical sensor with a fourth frame captured by the second optical sensor based on the rotational offset.

19 Claims, 4 Drawing Sheets

(58) Field of Classification Search
USPC .......................................................... 702/97
See application file for complete search history.

(56) References Cited

U.S. PATENT DOCUMENTS

| | | | |
|---|---|---|---|
| 11,719,821 B2* | 8/2023 | Pazhayampallil | B60W 40/105 |
| | | | 701/26 |
| 2007/0288133 A1 | 12/2007 | Nishira et al. | |
| 2010/0295940 A1 | 11/2010 | Schwarte | |
| 2016/0171898 A1 | 6/2016 | Silver | |
| 2016/0291149 A1 | 10/2016 | Zeng et al. | |
| 2019/0219700 A1 | 7/2019 | Coombe et al. | |
| 2019/0340445 A1 | 11/2019 | Chowdhury et al. | |
| 2019/0346561 A1 | 11/2019 | Hofmann | |
| 2019/0361106 A1 | 11/2019 | Stachnik et al. | |
| 2020/0027230 A1 | 1/2020 | Zhao et al. | |
| 2020/0211394 A1 | 7/2020 | King et al. | |
| 2020/0250837 A1 | 8/2020 | Fagg et al. | |

\* cited by examiner

METHOD FOR CALIBRATING OFFSETS BETWEEN DOPPLER-BASED SENSORS ON A MOBILE PLATFORM

CROSS-REFERENCE TO RELATED APPLICATIONS

This Application claims the benefit of U.S. Provisional Application No. 63/295,472, filed on 30 Dec. 2021, which is incorporated in its entirety by this reference.

This Application is related to U.S. patent application Ser. No. 17/182,165, filed on 22 Feb. 2021, which is incorporated in its entirety by this reference.

TECHNICAL FIELD

This invention relates generally to the field of autonomous vehicles and more specifically to a new and useful method for calibrating offsets between doppler-based sensors on a mobile platform in the field of autonomous vehicles

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

Figure 1:
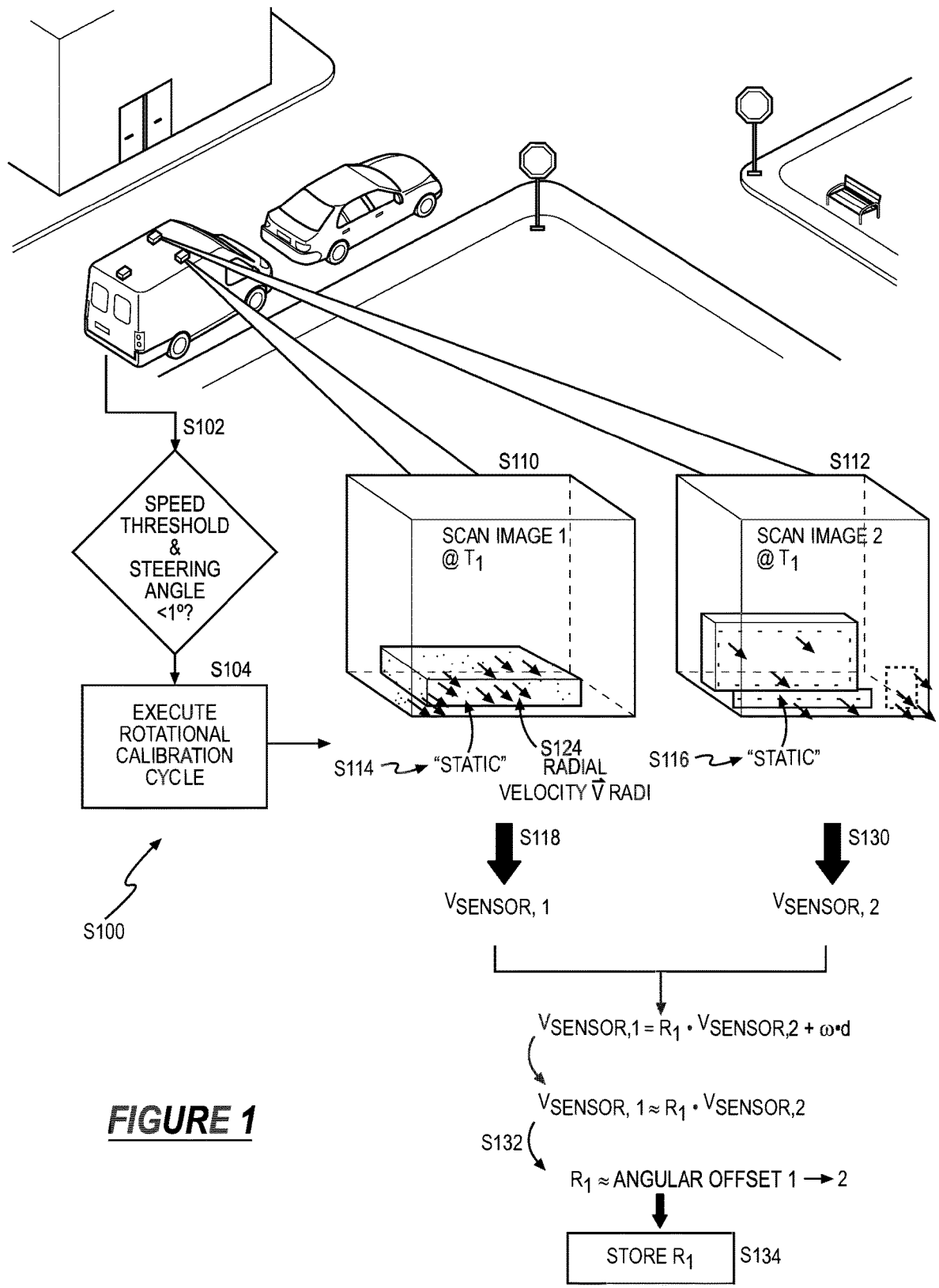
FIG. 1 is a flowchart representation of a method.
Figure 2:
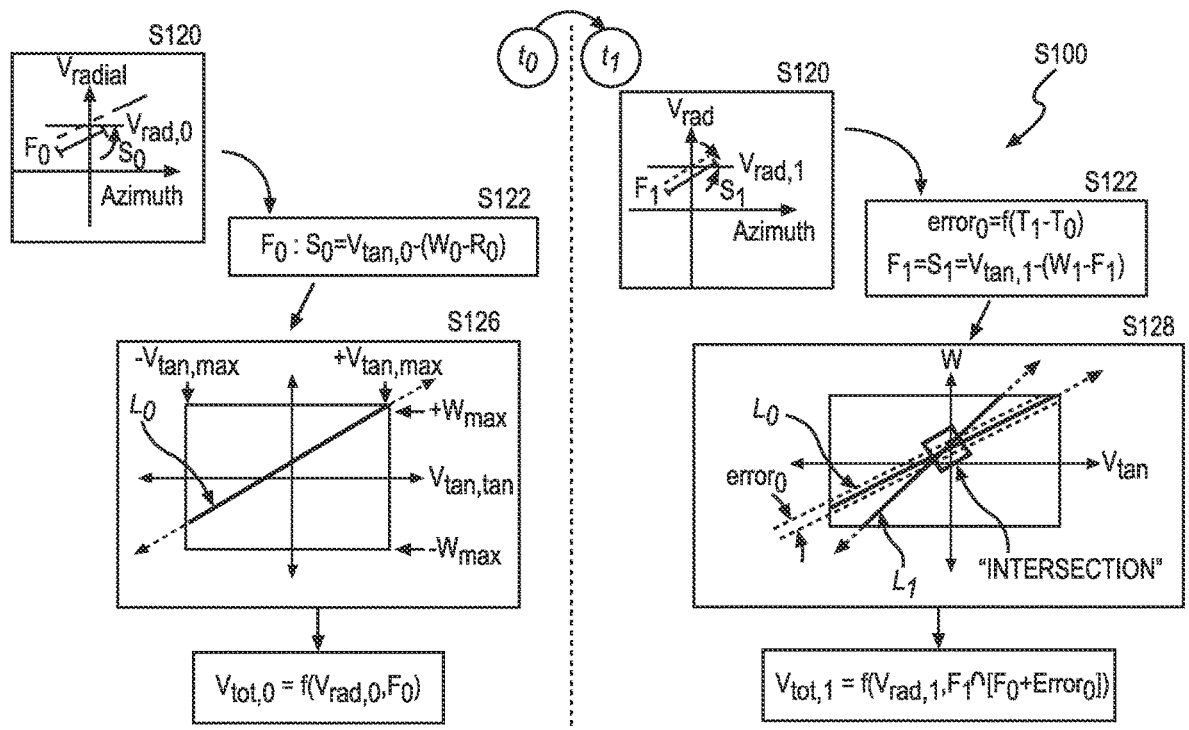
FIG. 2 is a flowchart representation of one variation of the method.

As shown in FIG. 1, a method S100 for calibrating relative positions of optical sensors on a mobile platform includes, during a first calibration period: accessing a first frame captured by a first optical sensor on the mobile platform in Block S110; and accessing a second frame captured by a second optical sensor on the mobile platform in Block S112. The first frame can include a first set of points containing radial positions, azimuthal positions, radial distances, and radial velocities relative to a first field of view of the first optical sensor, and the second frame can include a second set of points containing radial positions, azimuthal positions, radial distances, and radial velocities relative to a second field of view of the second optical sensor.

The method S100 can further include, during the first calibration period: isolating a first cluster of points, in the first set of points, representing a first static reference surface in the first frame in Block S114; isolating a second cluster of points, in the second set of points, representing a second static reference surface in the second frame in Block S116; deriving a first absolute motion of the first optical sensor based on radial positions, azimuthal positions, radial distances, and radial velocities of points in the first cluster of points in Block S118; deriving a second absolute motion of the second optical sensor based on radial positions, azimuthal positions, radial distances, and radial velocities of points in the second cluster of points in Block S130; calculating a first rotational offset between the first optical sensor and the second optical sensor based on the first absolute motion and the second absolute motion in Block S132; and storing the first rotational offset as a calibrated rotational offset between the first optical sensor and the second optical sensor in Block S134.

1.1 Variation: Motion Sensor Calibration

Figure 5:
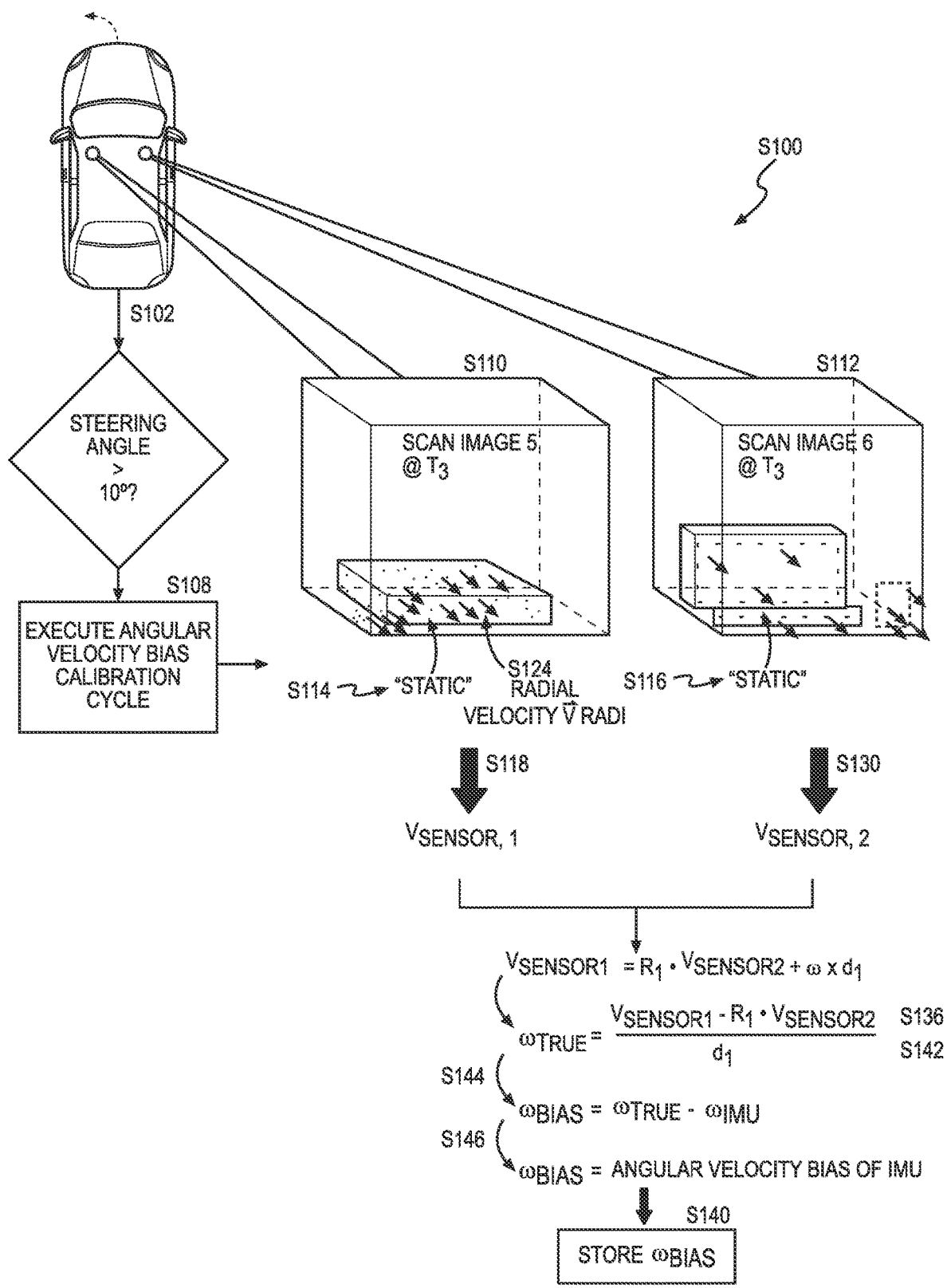
FIG. 5 is a flowchart representation of one variation of the method.

As shown in FIG. 5, one variation of the method S100 includes: recording a first angular velocity of the mobile platform by the motion sensor in Block S102; accessing a first frame captured by a first optical sensor on the mobile platform in Block S110; accessing a second frame captured by a second optical sensor on the mobile platform in Block S112; isolating a first cluster of points representing a first static reference surface in the first frame in Block S114; isolating a second cluster of points representing a second static reference surface in the second frame in Block S116; deriving a first absolute motion of the first optical sensor based on radial positions, azimuthal positions, radial distances, and radial velocities of points in the first cluster of points in Block S118; and deriving a second absolute motion of the second optical sensor based on radial positions, azimuthal positions, radial distances, and radial velocities of points in the second cluster of points in Block S130.

This variation of the method S100 further includes: accessing a first rotational offset between the first optical sensor and the second optical sensor in Block S136; accessing a first linear offset between the first optical sensor and the second optical sensor in Block S142; calculating a second angular velocity of the mobile platform based on the first absolute motion, the second absolute motion, the first rotational offset, and the first linear offset in Block S144; calculating a first angular velocity bias for the motion sensor based on a difference between the first angular velocity and the second angular velocity in Block S146; and storing the first angular velocity bias as a calibrated angular velocity bias for the motion sensor in Block S148.

1.2 Variation: Frame Alignment Based on Rotational Offset

Figure 3:
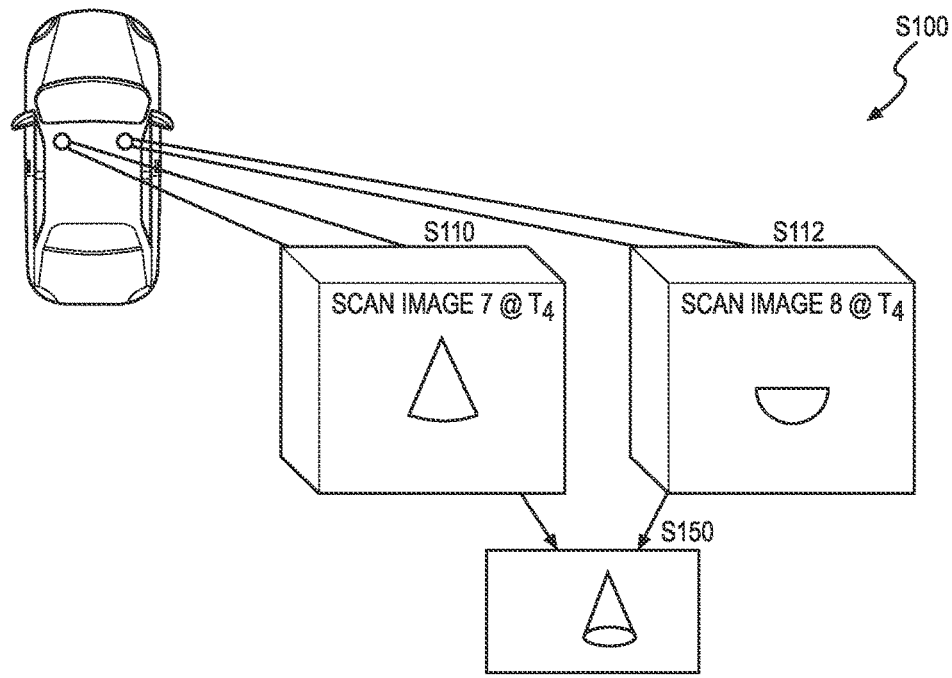
FIG. 3 is a flowchart representation of one variation of the method.

As shown in FIGS. 1 and 3, one variation of the method S100 includes: deriving a first absolute motion of the first optical sensor based on radial positions, azimuthal positions, radial distances, and radial velocities of points in a first cluster of points representing a first static reference surface in a first frame captured by the first optical sensor in Block S118; deriving a second absolute motion of the second optical sensor based on radial positions, azimuthal positions, radial distances, and radial velocities of points in a first cluster of points representing a first static reference surface in a second frame captured by the second optical sensor in Block S130; calculating a rotational offset between the first optical sensor and the second optical sensor based on the first absolute motion and the second absolute motion in Block S132; and aligning a third frame captured by the first optical sensor with a fourth frame captured by the second optical sensor based on the rotational offset in Block S150.

2. APPLICATIONS

Generally, a mobile platform (hereinafter an "autonomous vehicle") can execute Blocks of the method S100 to calibrate linear and rotation offsets between a set of (e.g., two) optical sensors on the autonomous vehicle based on motion of these optical sensors derived from frames captured by these optical sensors while the autonomous vehicle moves through a scene containing static (albeit unknown) surfaces. In particular, the autonomous vehicle can execute Blocks of the method S100 to calibrate relative positions of multiple optical sensors—each configured to output depth images representing surfaces labeled with radial velocities relative to the optical sensor—without prerequisite or specific environmental features (e.g., edges, known fiducials) in the scene around the autonomous vehicle, overlap in the fields of view of these optical sensor, and dedicated calibration cycles outside of routine operation.

Rather, the autonomous vehicle can execute Blocks of the method S100 to calibrate and recalibrate relative positions of optical sensors on the autonomous vehicle in real-time while the autonomous vehicle is moving, such as within an unknown or dynamic environment and/or within a feature poor environment (e.g., an empty parking lot). The autonomous vehicle can: derive observed motions of two optical sensors on the autonomous vehicle based on positions and radial velocities of points representing static surfaces in singular concurrent frames captured by the optical sensors; and execute joint optimization to calculate relative rotational and/or linear offsets—between the two optical sensors—that resolve these observed motions of the optical sensors in light of the true concurrent motion of the autonomous vehicle.

For example, the autonomous vehicle can regularly execute Blocks of the method S100 to achieve milli-radian rotational calibration of optical sensors on the autonomous vehicle in real-time during operation, such as once per minute, given a 1° F. change in ambient temperature, or for every frame captured by the optical sensors in order to compensate for: changes in ambient temperature; changes in optical sensor temperature during operation; and/or fatigue of optical sensor mounting systems.

The method is described herein as executed by an autonomous vehicle to calibrate relative positions of optical sensors on the autonomous vehicle. However, any other mobile or autonomous platform containing two or more optical sensors can similarly execute the method to calibrate relative positions of such optical sensors.

The method S100 is described herein as executed in conjunction with 4D (e.g., doppler-based) optical sensors. However, the method can additionally or alternatively be executed in conjunction with 4D radar sensor and/or sensors of any other type configured to output a 4D doppler point cloud.

3. AUTONOMOUS VEHICLE

The autonomous vehicle can include: a suite of sensors configured to collect data representative of objects in the field around the autonomous vehicle; local memory that stores a navigation map defining a route for execution by the autonomous vehicle, and a localization map that represents locations of immutable surfaces along a roadway; and a controller. The controller can: calculate the location of the autonomous vehicle in real space based on sensor data collected from the suite of sensors and the localization map; calculate future state boundaries of objects detected in these sensor data; elect future navigational actions based on these future state boundaries, the real location of the autonomous vehicle, and the navigation map; and control actuators within the vehicle (e.g., accelerator, brake, and steering actuators) according to these navigation decisions.

In one implementation, the autonomous vehicle includes a set of 360° light detection and ranging (hereinafter "LIDAR") sensors arranged on the autonomous vehicle, such as one LIDAR sensor arranged at the front of the autonomous vehicle and a second LIDAR sensor arranged at the rear of the autonomous vehicle, or a cluster of LIDAR sensors arranged on the roof of the autonomous vehicle. Each LIDAR sensor can output one three-dimensional distance map (or depth image)—such as in the form of a 3D point cloud representing distances between the LIDAR sensor and external surfaces within the field of view of the LIDAR sensor—per scan cycle (e.g., once per rotation) of the LIDAR sensor. The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field.

The autonomous vehicle can additionally or alternatively include a set of color cameras facing outwardly from the front, rear, and/or sides of the autonomous vehicle. For example, each camera in this set can output a video feed of digital photographic images (or "frames") at a rate of 20 Hz. The autonomous vehicle can also include a set of RADAR sensors facing outwardly from the autonomous vehicle and configured to detect presence and speeds of objects near the autonomous vehicle. The controller in the autonomous vehicle can thus fuse data streams from the LIDAR sensor(s), the color camera(s), and the RADAR sensor(s), etc. into one frame—such as in the form of a 3D color map or 3D point cloud containing constellations of points that represent roads, sidewalks, vehicles, pedestrians, etc. in the field around the autonomous vehicle—per scan cycle.

In one implementation, the autonomous vehicle includes a motion sensor, such as an IMU including a three-axis accelerometer and a three-axis gyroscope. During operation of the autonomous vehicle (e.g., during a calibration period), the autonomous vehicle can sample motion data from the motion sensor and interpret motion of the autonomous vehicle based on these motion data, such as including average angular pitch, yaw, and roll velocities during the second calibration period.

However, the autonomous vehicle can include any other sensors and can implement any other scanning, signal processing, and autonomous navigation techniques or models to determine its geospatial position and orientation, to perceive objects in its vicinity, and to elect navigational actions based on sensor data collected through these sensors.

3.1 Object Location & Motion Data

In one implementation, the autonomous vehicle includes a sensor that outputs a scan image (hereinafter a "frame") containing a constellation of points, wherein each point in this frame: represents a position of a surface in the environment relative to the sensor (or to the autonomous vehicle more generally); and specifies a speed of this surface along a ray extending from the sensor (or the autonomous vehicle more generally) to this surface.

In one example, the autonomous vehicle includes a 3D scanning LIDAR sensor configured to detect distances and relative speeds of surfaces—along rays extending from the sensor (or the autonomous vehicle more generally) to these surfaces—in the field around the autonomous vehicle. In this example, the 3D scanning LIDAR sensor can: represent a position of a surface in the field in spherical coordinates in a polar coordinate system—that defines an origin at the 3D scanning LIDAR sensor (or at a reference position on the autonomous vehicle); and store these polar coordinates in one frame per scan cycle (e.g., per rotation) of the sensor. Therefore, in this example, the autonomous vehicle can access a frame containing data captured by a four-dimensional light detection and ranging sensor: mounted on the autonomous vehicle; and configured to generate frames representing positions and speeds of surfaces within the field relative to the sensor.

In this example, the autonomous vehicle can include multiple such 3D scanning LIDAR sensors, each configured to output one frame per scan cycle. The autonomous vehicle can then fuse concurrent frames output by these sensors into one composite frame for this scan cycle.

Alternatively, the autonomous vehicle can include a suite of sensors that capture data of different types and can fuse outputs of these sensors into a frame containing points at locations of surfaces in the field and annotated with speeds of these surfaces along rays extending between the autonomous vehicle and these surfaces. For example, the autonomous vehicle can include a 3D scanning LIDAR sensor: that defines a LIDAR field of view; and configured to generate a 3D point cloud containing a constellation of points during a scan cycle, wherein each point defines a position of a region on a surface in the environment around the autonomous vehicle. In this example, the autonomous vehicle can also include a fixed or scanning RADAR sensor: that defines a RADAR field of view that intersects the LIDAR field of view; and that generates a list of objects or surfaces in the RADAR field of view during a scan cycle, wherein each object or surface in this list is annotated with a speed relative to the RADAR sensor. The autonomous vehicle then merges concurrent outputs of the LIDAR and RADAR sensors during a scan cycle to annotate points in the 3D point cloud with speeds of corresponding objects or surfaces detected by the RADAR sensor.

However, the autonomous vehicle can include any other type or configuration of sensors and can access or construct a frame representing relative positions and relative speeds of objects or surfaces in the field around the autonomous vehicle during a scan cycle.

4. ANGULAR POSITION CALIBRATION CYCLE

Generally, as shown in FIG. 1, the autonomous vehicle can initiate a calibration period to validate relative angular positions of (e.g., rotational offsets between) two optical sensors on the autonomous vehicle when the autonomous vehicle is in motion and moving in a (solely or predominantly) linear motion (e.g., straight in a forward direction), such as when the autonomous vehicle is moving along a straight section of highway at consistent speed. For example, the autonomous vehicle can initiate a calibration period when the autonomous vehicle is moving above a threshold speed (e.g., 8 mph), with a steering angle within a narrow angle range (e.g., −0.5° to +0.5°), and/or with less than threshold angular pitch, yaw, and roll velocities detected by a motion sensor in the autonomous vehicle.

More specifically, the autonomous vehicle can trigger execution of this calibration period to resolve a rotational offset between the first and second optical sensors in light of linear motion of the autonomous vehicle. Because the first and second optical sensors (and/or their coordinate systems) may be considered "fixed" on the autonomous vehicle over short time scales, the first and second optical sensors exhibit the same motion (i.e., absolute motion relative to the scene or environment around the autonomous vehicle) when the autonomous vehicle is moving linearly. Therefore, any difference in the egomotion of the first and second optical sensors—relative to static surfaces in the scene around the autonomous vehicle—derived from concurrent frames captured by the first and second optical sensors may be predominantly or wholly due to a rotational offset between the two optical sensors.

Accordingly, the autonomous vehicle can: initiate a calibration period in response to detecting or confirming linear motion of the autonomous vehicle; and derive the rotational offset between the two optical sensors (or "calibrate" the relative angular positions of the optical sensors) based on differences in motion observed by the two optical sensors, as derived from concurrent frames captured by the optical sensors.

4.1 Rotational Offset Calibration Initiation

Block S104 of the method S100 recites initiating a first calibration period in response to detecting a first angular velocity of the mobile platform falling below a maximum angular velocity.

In one implementation, in Block S104, the autonomous vehicle can detect an angular velocity of the autonomous vehicle (e.g., based on values detected by the motion sensor). In response to detecting the angular velocity falling below a maximum angular velocity (e.g., 0.5° per second), the autonomous vehicle can initiate the calibration period (e.g., for calibrating a rotational offset between the first and second optical sensors) in Block S104. However, in response to detecting the angular velocity exceeding the maximum angular velocity, the autonomous vehicle can wait for improved conditions (e.g., detected angular velocity of the autonomous vehicle falling below the maximum angular velocity) to initiate the calibration period.

Additionally or alternatively, the autonomous vehicle can: detect a speed of the mobile platform (e.g., based on values detected by the motion sensor); and initiate the calibration period in response to detecting the speed exceeding a threshold speed (e.g., 8 mph).

4.2 First Optical Sensor & Object Motions

Block S110 of the method S100 recites accessing a first frame captured by a first optical sensor on the mobile platform, the first frame including a first set of points containing radial positions, azimuthal positions, radial distances, and radial velocities relative to a first field of view of the first optical sensor.

Block S114 of the method S100 recites isolating a first cluster of points, in the first set of points, representing a first static reference surface in the first frame.

Generally, in Block S110 the autonomous vehicle can access a first frame captured by the first optical sensor and containing a first set of points labeled with radial velocities (e.g., Doppler shifts), radial positions, and azimuthal positions in the field of view of the first optical sensors. The autonomous vehicle can then group points in the first frame into clusters of points that exhibit congruent motion in Block S114, such as described in U.S. patent application Ser. No. 17/182,165.

4.2.1 Object Detection

Generally, the autonomous vehicle can: access a new frame output by the optical sensor (e.g., during a calibration period); detect an object in this new scan image; and extract a limited set of high-certainty motion characteristics of this object (e.g., radial speed relative to the autonomous vehicle) from this new frame.

In one implementation, the autonomous vehicle can capture (or access) a frame at the first optical sensor, such as a four dimensional LIDAR sensor mounted on the autonomous vehicle and configured to generate frames representing positions and speeds of surfaces within a field of view of the LIDAR sensor.

In another implementation, following access (or capture) of a frame for a current scan cycle, the autonomous vehicle executes object detection techniques to associate groups of points in the frame with discrete objects in the field around the autonomous vehicle. For example, the autonomous vehicle can: aggregate (or isolate) a group of points clustered at similar depths from the autonomous vehicle and that are tagged with speeds (e.g., range rates, azimuthal speeds) that are self-consistent (e.g., exhibiting congruent motion) for a contiguous object; and associate this group of points with one object in the field.

The autonomous vehicle can then extract a radial speed (or "range rate") of the object along a ray extending from the autonomous vehicle to the object (hereinafter the "radial direction") and an angular velocity of the object relative to the autonomous vehicle from this scan image. For example, the autonomous vehicle can: transform the radial speeds of points defining this object into absolute speeds in an absolute reference system based on a location and a velocity of the autonomous vehicle in the absolute reference system at the current time; and calculate an angular velocity (or "yaw") of the object about its center in the absolute reference system during the current frame based on a difference between the absolute radial speeds of the leftmost point(s) and the rightmost point(s) contained in the group of points associated with this object. In this example, the autonomous vehicle can also: average radial speeds stored in a subset of points near the centroid of this group of points that define this object; and store this average radial speed as the radial speed of the object—relative to the autonomous vehicle—in a radial direction along a ray from the center of the autonomous vehicle to the centroid of this group of points. The autonomous vehicle can also transform this radial speed of the object relative to the autonomous vehicle into an absolute speed of the object in the radial direction based on the velocity and angular speed of the autonomous vehicle during this scan cycle.

The autonomous vehicle can repeat this process for other groups of points—in this frame—representing other objects in the field around the autonomous vehicle.

4.2.2 Object Tracking

The autonomous vehicle can also implement object tracking techniques: to link a group of points—representing a particular object in the current frame—to a similar group of points detected in the preceding frame; and to link these groups of points—and the objects they represent—across these two frames. However, if the autonomous vehicle fails to match a group of points detected in the current frame to a group of points—at similar positions and velocities—in the preceding frame(s), the autonomous vehicle can label this group of points in the current frame as a new object (e.g., an object first entering the field of view of the autonomous vehicle during the current scan cycle).

4.2.2 Static Object Selection: Previous Calibration Available

In one implementation in which the positions of optical sensors on the autonomous vehicle were previously calibrated, the autonomous vehicle can implement methods and techniques described in U.S. patent application Ser. No. 17/182,165 to calculate absolute velocities of objects in the field of view of the optical sensor.

In particular, the autonomous vehicle can: retrieve a preceding frame captured by the first optical sensor immediately prior to the first frame; identify a first cluster of points with congruent motion in the preceding frame as a first object; track the first object from the preceding frame to the first frame; identify a second cluster of points representing the first object in the second frame; and derive relative motion of the first object—relative to the first optical sensor—from radial velocities of points in the first and second clusters of points representing the first object. The autonomous vehicle can then estimate a first relative position of a first object—in the first set of objects—relative to the autonomous vehicle (e.g., relative to the motion sensor in the autonomous vehicle) during the calibration period based on the last calibrated position of the first optical sensor and a position of the first object in the first frame. Furthermore, the autonomous vehicle can then calculate an absolute motion of the first object during the calibration period based on: a first relative motion of the first object derived from the preceding and first frames; the first relative position of first object; and motion of the autonomous vehicle during the calibration period.

The autonomous vehicle can then repeat this process for each object represented by clusters of points in the preceding and first frames to calculate absolute motions of objects in the field of view of the first optical sensor during the calibration period.

In particular, the position of the first optical sensor (or any optical sensor on the autonomous vehicle) may change slowly over time (or "creep"), such as due to fatigue of mounting locations or slipping joints. Aside from catastrophic damage such as a collision, the position of the first optical sensor may be generally consistent over time. Therefore, once the position of the first optical sensor—relative to the motion sensor on the autonomous vehicle—is initially calibrated, the autonomous vehicle can leverage the last calibrated position of the first optical sensor to estimate absolute motion of objects in the field of view of the first optical sensor based on: motion of these objects relative to the first optical sensor, as derived from radial velocities of points representing these objects over multiple (e.g., two) frames captured during the current calibration period; and absolute motion of the motion sensor during the calibration period. The autonomous vehicle can then: identify a first subset of objects—in the first set of objects—that are static (i.e., exhibiting absolute motion of 'null'); and compile points representing the first subset of objects in the first frame into a first static reference surface.

Therefore, in this implementation, the autonomous vehicle can fuse a) derived relative motions of objects in the field of view of the first optical sensor during the calibration period, b) absolute motion of the motion sensor during the calibration period and c) a last calibrated position of the first optical sensor relative to the motion sensor in order to estimate absolute angular and linear velocities of the first set of objects. The autonomous vehicle can then: isolate a first subset of these objects characterized by absolute angular and linear velocities of approximately null; and compile points representing the first subset of objects into a first static reference surface.

Alternatively, the autonomous vehicle can select a first reference object from this first subset, such as a largest static object in the first subset; a largest static object nearest a target distance from the first optical sensor (e.g., nearest a nominal operating distance of the first optical sensor, such as ten meters); a static object represented by more than a minimum quantity of points in the first set of frames and nearest a ground plane (e.g., a planar road surface); and/or an object not identified as mutable (e.g., a pedestrian, a vehicle) by a perception model executed by the autonomous vehicle.

4.2.4 First Static Object: No Previous Calibration

In one implementation in which the autonomous vehicle has not previously executed the method to calibrate rotational offset of the first and second optical sensor or in which the autonomous vehicle is configured to calibrate this rotational offset without previous calibration results, the autonomous vehicle can: isolate subsets of points in the first frame that intersect or fall very near a ground plane around the autonomous vehicle and that exhibit congruent motion; and store these points as represent a first static reference surface in the scene around the autonomous vehicle during the current calibration period.

Generally, without previous calibration of the first optical sensor relative to the motion sensor, the autonomous vehicle may be unable to accurately and repeatably calculate absolute motions of the first set of objects (e.g., based on relative positions and motions of these objects relative to the first optical sensor, the position of the first optical sensor relative to the motion sensor, and the absolute motion of the motion sensor). Accordingly, the autonomous vehicle may be unable to accurately and repeatably identify and confirm that objects in the scene around the autonomous vehicle are static during the calibration period. Therefore, the autonomous vehicle can instead: identify a road or other ground surface—which is nominally static—in the first frame; and compile points representing the road or other ground surface into a first static reference surface for the first optical sensor during the calibration period.

For example, the autonomous vehicle can isolate a first cluster of points—in the first frame—that: approximate a planar surface represented by a normal vector nonparallel to the axis of rotation of the first optical sensor; fall within a threshold distance of the autonomous vehicle (e.g., between two meters and ten meters from the first optical sensor); and intersect a known ground plane or otherwise occupy lowest positions within the first frame. The autonomous vehicle can then label this first cluster of points as representing a first reference surface.

4.2.5 First Optical Sensor Absolute Motion Data

Block S118 of the method S100 recites deriving a first absolute motion of the first optical sensor based on radial positions, azimuthal positions, radial distances, and radial velocities of points in the first cluster of points.

Generally, in Block S118, the autonomous vehicle stores the relative motion of the first static reference surface—derived from radial velocities of corresponding points in the first frame—as the absolute motion of the first optical sensor during the calibration period.

In particular, each point in the first frame contains a radial position (e.g., a yaw angle), a radial distance, an azimuthal position (e.g., a pitch angle), and/or a radial velocity (e.g., Doppler shift) in the field of view of the first optical sensor—and therefore in a coordinate system of the first optical sensor. The first cluster of points—representing the first static reference surface—are static, and their motion is therefore known and fully defined.

Accordingly, in one implementation, the autonomous vehicle derives a motion of the first optical sensor—in three degrees of freedom in the coordinate system of the first optical sensor—that resolves the radial velocity of the first static reference surface at the radial distance, radial position, and azimuthal position of multiple points (e.g., many point, every point) of the first static reference surface, such as including linear velocities along pitch, yaw, and roll axes of the first optical sensor.

4.2.6 Motion Disambiguation

In one variation, as shown in FIG. 3, the autonomous vehicle can derive motion of the first optical sensor by: calculating a first correlation between radial velocities and azimuthal positions of points in the first cluster of points in Block S120; based on the first correlation, calculating a first function relating a first set of combinations of possible tangential velocities of the first optical sensor and possible angular velocities of the first optical sensor coherent with radial velocities of the first cluster of points in Block S122; calculating a first total radial velocity of the first optical sensor based on radial velocities of points in the first cluster of points in Block S124; and estimating a first tangential velocity of the first optical sensor based on the total radial velocity of the first optical sensor and the first function in Block S126. For example, the autonomous vehicle can derive absolute motion of the first optical sensor based on (e.g., equal to a sum of) the first total radial velocity of the first optical sensor and the first tangential velocity.

Generally, an optical sensor can return range (e.g., distance), azimuth angle, and speed along a ray from a surface in the field back to the optical sensor (e.g., radial velocity or "Doppler") for each point in the field that falls within the field of view of the optical sensor during a scan cycle. The tangential velocity (e.g., linear motion in a direction perpendicular to the radial velocity and in a horizontal plane) and angular velocity (e.g., angular motion about a yaw axis of the autonomous vehicle) of a cluster of points—that represent a static reference surface in a frame—are contained in the range, azimuthal angle, and speed data of points in this frame.

In this variation, the autonomous vehicle can execute Blocks of the method S100 to derive a first relationship (or "correlation") between tangential and angular velocities of the reference surface during a first scan cycle based on range, azimuth angle, and radial velocity data contained in a cluster of points representing a static reference surface in a first frame. The autonomous vehicle can: calculate positions of points in the cluster relative to the autonomous vehicle (e.g., within a polar coordinate system) based on the range values and angular positions of these points at T0; and calculate a correlation between the angular positions and radial velocities of these points. In one example, the autonomous vehicle calculates this correlation as the slope of the best-fit (or "trend") line through these radial velocities divided by: the cosine of the angles between the points and the average position of this cluster of points; and the sine of the angles between the points and the average position of this cluster of points.

The autonomous vehicle then calculates a first slope $S_0$ of this best-fit line, which represents a relationship between the tangential velocity $V_{tan,0}$ and the angular velocity $\omega_0$ of the reference surface at time $T_0$. In particular, this slope $S_0$ may represent a difference between: $V_{tan,0}$; and the product of $\omega_0$ multiplied by a first radius $R_0$ of the reference surface, in the field of view of the sensor, at time $T_0$. The autonomous vehicle can therefore generate a first function (e.g., a linear function) $F_0$ that relates $V_{tan,0}$ and $\omega$ of the reference surface based on the slope $S_0$ and the radius $R_0$ at time $T_0$.

Based on function $F_0$, the autonomous vehicle can calculate line $L_0$, which represents possible $V_{tan,0}$ and $\omega_0$ motion combinations of the reference surface at time $T_0$ given the current radial velocity $V_{rad,0}$ of the reference surface at T0. Additionally, because the angular velocity $\omega_0$ is approximately null, the autonomous vehicle can estimate the full motion of the optical sensor based on the line $L_0$ given $\omega_0=0$ and the current radial velocity $V_{rad,0}$ of the reference surface at $T_0$.

The autonomous vehicle can repeat this process during a second scan cycle to calculate a second relationship between tangential and angular velocities of the static reference surface during a second scan cycle based on range, azimuth angle, and radial velocity data contained in a cluster of points representing the static reference surface in a second frame; and derive a specific tangential velocity and specific angular velocity (or a narrow range thereof) of the static reference surface that is congruent with both the first and second relationships.

In another variation, the autonomous vehicle can: access a third frame captured by the first optical sensor in Block S110; isolate a third cluster of points representing the first static reference surface in the third frame in Block S114; calculate a second correlation between radial velocities and azimuthal positions of points in the third cluster of points in Block S120; based on the second correlation, calculate a second function relating a second set of combinations of possible tangential velocities of the first optical sensor and possible angular velocities of the first optical sensor coherent with radial velocities of the third cluster of points in Block S122; calculate a second total radial velocity of the first optical sensor based on radial velocities of points in the third cluster of points in Block S124; and estimate a second tangential velocity (and/or a second angular velocity) of the first optical sensor based on an intersection of the first function and the second function in Block S128. For example, the autonomous vehicle can derive absolute motion of the first optical sensor based on (e.g., equal to a sum of) the second total radial velocity of the first optical sensor, the second tangential velocity, and/or the second angular velocity.

4.2 Second Optical Sensor & Object Motions

Blocks of the method S100 recite: accessing a second frame captured by a second optical sensor on the mobile platform in Block S112, the second frame including a second set of points containing radial positions, azimuthal positions, radial distances, and radial velocities relative to a second field of view of the second optical sensor; isolating a second cluster of points, in the second set of points, representing a second static reference surface in the second frame in Block S116; and deriving a second absolute motion of the second optical sensor based on radial positions, azimuthal positions, radial distances, and radial velocities of points in the second cluster of points in Block S130.

The autonomous vehicle can repeat the foregoing process for the second optical sensor and a second frame to derive a second absolute motion of the second optical sensor during the calibration period in Blocks S112, S116, and S130.

More specifically, the autonomous vehicle can: access a second frame captured by a second optical sensor (e.g., four-dimensional LIDAR sensor) mounted on the autonomous vehicle in Block S112; isolate a second cluster of points representing a second static reference surface in the second frame in Block S116; and derive a second absolute motion of the second optical sensor based on radial positions, azimuthal positions, radial distances, and radial velocities of points in the second cluster of points in Block S130.

4.4 Rotational Offset Between the First and Second Optical Sensors

Blocks of the method S100 recite: calculating a first rotational offset between the first optical sensor and the second optical sensor based on the first absolute motion and the second absolute motion in Block S132; and storing the first rotational offset as a calibrated rotational offset between the first optical sensor and the second optical sensor in Block S134.

Blocks of the method S100 recite, during a time period succeeding the first calibration period: accessing a third frame captured by the first optical sensor in Block S110; accessing a fourth frame captured by the second optical sensor in Block S112; and generating a composite frame based on the third frame, the fourth frame, and the first rotational offset in Block S150.

In one implementation, in Block S132, the autonomous vehicle solves for rotations between the observed ego velocities of the first and second optical sensors via mathematical optimization according to a function $$V_{sensor1} = R \cdot V_{sensor2} + \omega \times d$$

wherein $V_{sensor1}$ is the observed 3D motion (e.g., derived absolute velocity) of the first optical sensor, $V_{sensor2}$ is the observed 3D motion of the second optical sensor, R is the rotational offset (i.e., a 3D rotation) between the first and second optical sensor, $\omega$ is the rotation vector (e.g., angular velocity) of the autonomous vehicle during the calibration period, and d is the displacement vector (e.g., linear offset, 3D Euclidean distance) between the first optical sensor and the second optical sensor.

However, in this implementation, because the motion of the autonomous vehicle is predominately or solely linear during this calibration period, the angular velocity $\omega$ is approximately null. Therefore, the autonomous vehicle can derive the rotational offset between the first and second sensors based predominantly or solely on the observed 3D motions of the first and second optical sensors during the calibration period.

More specifically, in this implementation, the autonomous vehicle can calculate the rotational offset between the first optical sensor and the second optical sensor based on (e.g., approximately equal to) a ratio of the first absolute velocity of the first optical sensor and the second absolute velocity of the second optical sensor, such as according to the function:

$$R \approx \frac{V_{sensor1}}{V_{sensor2}}$$

The autonomous vehicle can then store this resulting R value as a calibrated rotational offset between the first optical sensor and the second optical sensor. Later, the autonomous vehicle can align a frame captured by the first optical sensor with a concurrent frame captured by the second optical sensor to form a single, spatially-accurate image of a scene around the autonomous vehicle based on this calibrated rotational offset.

In one implementation, the autonomous vehicle can: access a third frame captured by the first optical sensor in Block S110; access a fourth frame—concurrent with the third frame—captured by the second optical sensor in Block S112; and generate a composite frame based on the third frame, the fourth frame, and the calibrated rotational offset in Block S150. For example, the autonomous vehicle can align the third frame captured by the first optical sensor and the fourth frame captured by the second optical sensor based on the calibrated rotational offset.

5. LINEAR POSITION CALIBRATION CYCLE

Figure 4:
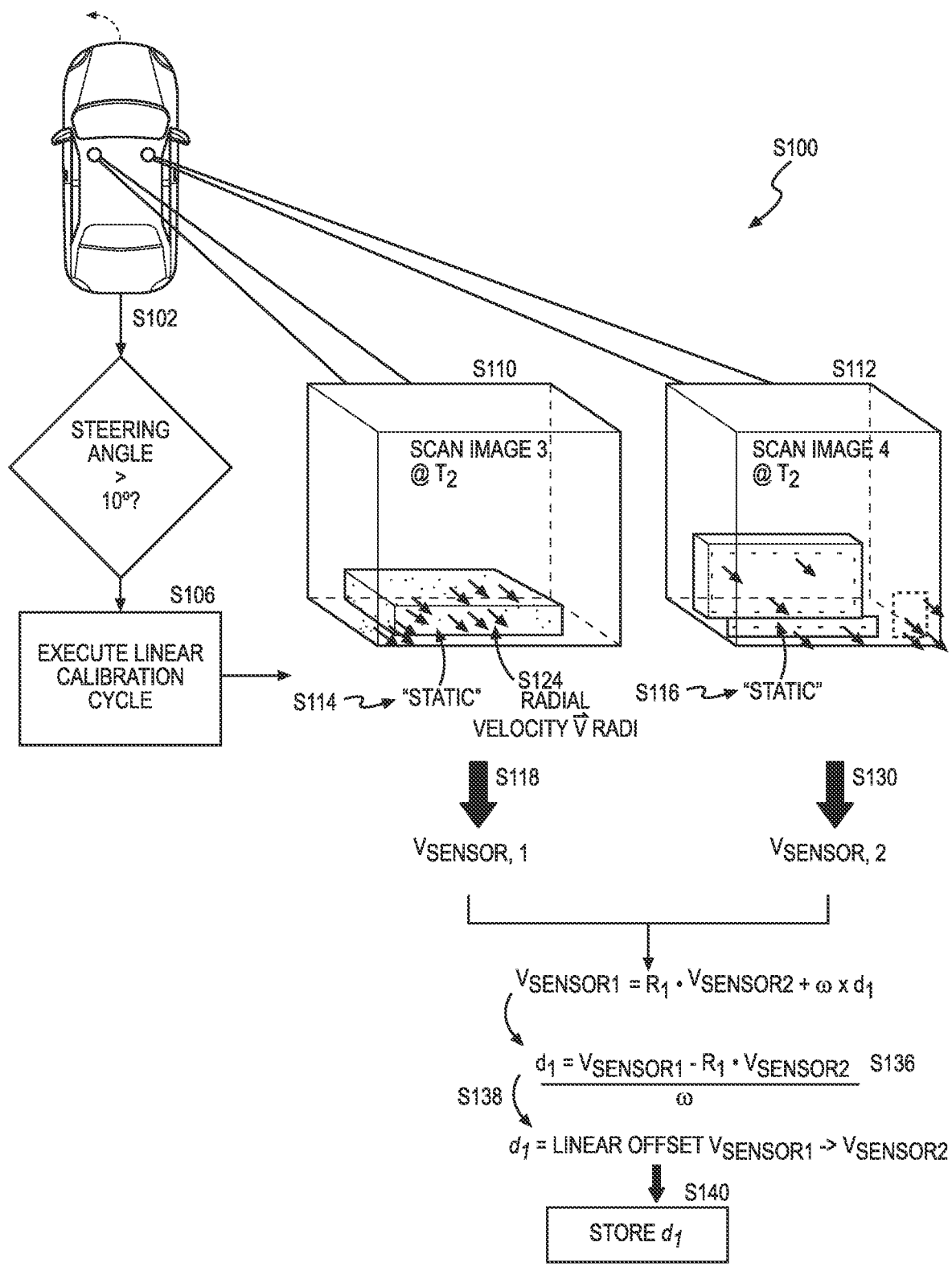
FIG. 4 is a flowchart representation of one variation of the method.

Generally, as shown in FIG. 4, the autonomous vehicle can initiate a calibration period to calculate (or "calibrate")

a relative linear offset between the first and second optical sensors on the autonomous vehicle when the autonomous vehicle is in motion and moving in an arcuate motion, such as when the autonomous vehicle is moving above a threshold speed with a steering angle greater than a threshold angle (e.g., 10°) and/or or above a threshold angular yaw velocity.

The autonomous vehicle can then execute Blocks of the method S100 to resolve a (three-dimensional, Euclidean) linear offset between first and second optical sensors given angular motion of the autonomous vehicle. Because the first and second optical sensors (and/or their coordinate systems) are fixed on the autonomous vehicle, the optical sensors exhibit different ego motion—and specifically different linear velocities when the autonomous vehicle is turning. In particular, any difference in the motions of the first and second optical sensors—relative to static surfaces in the scene around the autonomous vehicle and derived from concurrent frames captured by the optical sensors—may be due to the angular rate of the autonomous vehicle and a fixed linear offset between the first and second optical sensors. Accordingly, the autonomous vehicle can derive the linear offset between the first and second optical sensors (or "calibrate" the relative linear positions of the optical sensors) based on the difference in the motion of the optical sensors—derived from concurrent frames captured by the optical sensors—and the calibrated rotational offset between the first and second optical sensors derived during a previous calibration period as described above.

5.1 Linear Offset Calibration Cycle Initiation

Blocks of the method S100 recite: accessing a second angular velocity of the mobile platform in Block S102; and initiating the second calibration period in response to detecting the second angular velocity of the mobile platform exceeding a minimum angular velocity in Block S1106.

In one implementation, in Block S102, the autonomous vehicle can detect an angular velocity of the mobile platform (e.g., based on values detected by the motion sensor). In response to detecting the angular velocity exceeding a minimum angular velocity (e.g., 10° per second), the autonomous vehicle can initiate the calibration period (e.g., for calibrating a linear offset between the first and second optical sensors) in Block S106. However, in response to detecting the angular velocity falling below the minimum angular velocity, the autonomous vehicle can wait for improved conditions of the mobile platform (e.g., detected angular velocity of the mobile platform exceeding the minimum angular velocity) to initiate the calibration period.

Additionally or alternatively, the autonomous vehicle can: detect a speed of the mobile platform (e.g., based on values detected by the motion sensor); and initiate the calibration period in response to detecting the speed exceeding a threshold speed (e.g., 8 mph).

5.2 Reference Surfaces & Optical Sensor Motions

Blocks of the method S100 recite: accessing a third frame captured by the first optical sensor in Block S110, the third frame including a third set of points containing radial positions, azimuthal positions, radial distances, and radial velocities relative to the first field of view of the first optical sensor; isolating a third cluster of points, in the third set of points, representing a third static reference surface in the third frame in Block S114; and deriving a third absolute motion of the first optical sensor based on radial positions, azimuthal positions, radial distances, and radial velocities of points in the third cluster of points in Block S118.

Blocks of the method S100 recite: accessing a fourth frame captured by the second optical sensor in Block S112, the fourth frame including a fourth set of points containing radial positions, azimuthal positions, radial distances, and radial velocities relative to the second field of view of the second optical sensor; isolating a fourth cluster of points, in the fourth set of points, representing a fourth static reference surface in the fourth frame in Block S116; and deriving a fourth absolute motion of the second optical sensor based on radial positions, azimuthal positions, radial distances, and radial velocities of points in the fourth cluster of points in Block S130.

Generally, the autonomous vehicle can: access a first frame captured by the first optical sensor in Block Silo; isolate a first static reference surface in the first frame in Block S114; and derive absolute motion of the first optical sensor during the second calibration period based on relative motion of the first static reference surface represented in the first frame in Block S118.

Similarly, the autonomous vehicle can: access a second frame captured by the second optical sensor in Block S112; isolate a second static reference surface in the second frame in Block S116; and derive absolute motion of the second optical sensor during the second calibration period based on relative motion of the second static reference surface represented in the second frame in Block S130.

5.3 Linear Offset Between the First and Second Optical Sensors

Blocks of the method S100 recite: calculating a first linear offset between the first optical sensor and the second optical sensor based on the third absolute motion, the fourth absolute motion, the first rotational offset, and the second angular velocity of the mobile platform in Block S138; and storing the first linear offset as a calibrated linear offset between the first optical sensor and the second optical sensor in Block S140.

In one implementation, in Block S138, the autonomous vehicle solves for d in the function $$V_{sensor1} = R \cdot V_{sensor2} + \omega \times d$$

wherein $V_{sensor1}$ is the observed 3D motion (e.g., derived absolute velocity) of the first optical sensor, $V_{sensor2}$ is the observed 3D motion of the second optical sensor, R is the rotational offset between the first and second optical sensors previously calibrated in S132 described above, $\omega$ is the rotation vector (e.g., angular velocity) of the autonomous vehicle during the second calibration period, and d is the displacement vector (e.g., linear offset, 3D Euclidean distance) between the first optical sensor and the second optical sensor. In particular, in this implementation, the autonomous vehicle exhibits non-zero angular velocity $\omega$ during the second calibration period and the rotational offset R was derived previously. Therefore, the autonomous vehicle can directly solve for the 3D linear offset between the first and second sensors based on the observed 3D motions of the first and second optical sensors during the second calibration period.

For example, the autonomous vehicle can: calculate a first value characterized by a product of the rotational offset and the absolute motion of the second optical sensor; calculate a second value characterized by a difference between the absolute motion of the first optical sensor and the first value; and calculate the linear offset based on (e.g., equal to) a ratio between the second value and the observed angular velocity of the autonomous vehicle, such as according to the function:

$$d = \frac{V_{sensor1} - R \cdot V_{sensor2}}{\omega}$$

The autonomous vehicle can then store this resulting d value as a calibrated linear offset between the first and second optical sensors. Later, the autonomous vehicle can align a frame captured by the first optical sensor with a concurrent frame captured by the second optical sensor to form a single, spatially-accurate image of a scene around the autonomous vehicle based on this calibrated linear offset.

6. OPTICAL SENSOR RECALIBRATION

The autonomous vehicle can repeat the foregoing methods during angular and linear calibration cycles to iteratively refine these derived angular and linear offsets between the first and second optical sensors over multiple calibration periods.

6.1 Rotational Offset Recalculation

In one implementation, in Block S104, the autonomous vehicle can: initiate a subsequent calibration period in response to detecting expiration of a threshold duration of time (e.g., 1 hour, 1 day, 1 week) succeeding a prior calibration period in which a prior rotational offset is calculated; and calculate a subsequent rotational offset between the first and second optical sensors, as described above.

For example, during a second calibration period succeeding a first calibration period, the autonomous can: access a third frame captured by the first optical sensor in Block S110, the third frame including a third set of points containing radial positions, azimuthal positions, radial distances, and radial velocities relative to the first field of view of the first optical sensor; isolate a third cluster of points, in the third set of points, representing a third static reference surface in the first frame in Block S114; and derive a third absolute motion of the first optical sensor based on radial positions, azimuthal positions, radial distances, and radial velocities of points in the third cluster of points in Block S118.

Similarly, during the second calibration period, the autonomous vehicle can: access a fourth frame captured by the second optical sensor in Block S112, the fourth frame including a fourth set of points containing radial positions, azimuthal positions, radial distances, and radial velocities relative to the second field of view of the second optical sensor; isolate a fourth cluster of points, in the fourth set of points, representing a fourth static reference surface in the second frame in Block S116; and derive a fourth absolute motion of the second optical sensor based on radial positions, azimuthal positions, radial distances, and radial velocities of points in the fourth cluster of points in Block S130.

In this example, the autonomous vehicle can: calculate a second rotational offset between the first optical sensor and the second optical sensor based on the third absolute motion and the fourth absolute motion in Block S132; and store the second rotational offset as the calibrated rotational offset between the first optical sensor and the second optical sensor in Block S134.

6.1.1 Rotational Offset Selection

Generally, the autonomous vehicle can store a new rotational offset—replacing a prior rotational offset—as the calibrated rotational offset between the first optical sensor and the second optical sensor based on a set of operating conditions of the autonomous vehicle. More specifically, the autonomous vehicle can more accurately calculate a rotational offset between the first and second optical sensors during calibration cycles in which the autonomous vehicle exhibits improved operating conditions, such as decreased angular velocity and/or increased speed.

Accordingly, the autonomous vehicle can: selectively store a particular rotational offset—calculated during a calibration cycle in which the autonomous vehicle exhibits these improved operating conditions—as the calibrated rotational offset between the first optical sensor and the second optical sensor, thereby iteratively refining accuracy of the calibrated rotational offset (and the calibrated linear offset in subsequent calibration cycles).

In one implementation, the autonomous vehicle can store the second rotational offset as the calibrated rotational offset—replacing the first rotational offset—in response to detecting improved conditions of the autonomous vehicle between the prior calibration period and the subsequent calibration period. For example, in response to detecting a second angular velocity of the autonomous vehicle during a second calibration period falling below a first angular velocity of the autonomous vehicle during a first calibration period, the autonomous vehicle can store the second rotational offset as the calibrated rotational offset between the first optical sensor and the second optical sensor. Additionally or alternatively, the autonomous vehicle can store the second rotational offset as the calibrated rotational offset between the first optical sensor and the second optical sensor in response to detecting a second speed of the autonomous vehicle during the subsequent calibration period exceeding a first speed of the autonomous vehicle during the first calibration period. However, the autonomous vehicle can discard the second rotational offset in response to: detecting the second angular velocity exceeding the first angular velocity; and/or detecting the second speed falling below the first speed.

6.2 Linear Offset Recalculation

The autonomous vehicle can implement similar methods and techniques to: initiate a subsequent calibration period in response to detecting expiration of a threshold duration of time succeeding a prior calibration period in which a prior linear offset is calculated; calculate a subsequent linear offset between the first and second optical sensors; and store the subsequent linear offset as the calibrated linear offset between the first optical sensor and the second optical sensor.

Similarly, the autonomous vehicle can store the second linear offset as the calibrated linear offset in response to detecting improved conditions of the autonomous vehicle between the prior calibration period and the subsequent calibration period, such as in response to detecting a second angular velocity of the autonomous vehicle during a second calibration period exceeding a first angular velocity of the autonomous vehicle during a first calibration period.

6.3 Post-Collision Calibration

Additionally or alternatively, the autonomous vehicle can initiate angular and/or linear calibration cycles (e.g., of the first and second optical sensors) in response to detecting a collision of the autonomous vehicle.

In one example, the autonomous vehicle can initiate an angular calibration cycle in response to: detecting a collision of the autonomous vehicle, such as based on a detected impact on the autonomous vehicle exceeding a threshold force (e.g., 5,000 lb. average impact force); detecting an angular velocity of the autonomous vehicle falling below a maximum angular velocity (e.g., 0.5° per second); and/or detecting a speed of the autonomous vehicle exceeding a threshold speed (e.g., 8 mph).

In another example, the autonomous vehicle can initiate a linear calibration cycle in response to: detecting a collision of the autonomous vehicle, such as based on a detected impact on the autonomous vehicle exceeding the threshold force; detecting an angular velocity of the autonomous vehicle exceeding a minimum angular velocity (e.g., 10° per second); and/or detecting a speed of the autonomous vehicle exceeding the threshold speed.

Accordingly, the autonomous vehicle can perform these calibration cycles, in response to detecting a collision of the autonomous vehicle, to calculate new rotational and/or angular offsets between (or to "recalibrate") the first and second optical sensors that may be displaced (e.g., linear displacement, angular displacement) due to the collision.

7. CALIBRATION OF MULTIPLE OPTICAL SENSORS

The autonomous vehicle can also include additional optical sensors, such as three or ten optical sensors defining different fields of view around the autonomous vehicle. Accordingly, the autonomous vehicle can execute the foregoing methods and techniques to derive and refine angular and linear offsets between each combination of two optical sensors on the autonomous vehicle during a single calibration period based on concurrent frames captured by each optical sensor or during multiple consecutive calibration periods based on series of frames captured by the optical sensors. The autonomous vehicle can then triangulate relative positions of all optical sensors on the autonomous vehicle based on rotational and linear offsets between combinations of optical sensors on the autonomous vehicle.

Additionally or alternatively, for the autonomous vehicle that includes three or more optical sensors, the autonomous vehicle can define various permutations of two groups of one or more optical sensors each. For each permutation, the autonomous vehicle can: fuse concurrent frames from optical sensors in the first group into a first composite frame; fuse concurrent frames from optical sensors in the second group into a second composite frame; and execute Blocks of the method S100 to derive and refine angular and linear offsets between the two groups of optical sensors during one calibration period.

8. MOTION SENSOR CALIBRATION

Blocks of the method S100 recite: accessing a fifth frame captured by the first optical sensor in Block Silo; isolating a fifth cluster of points representing a fifth static reference surface in the fifth frame in Block S114; and deriving a fifth absolute motion of the first optical sensor based on radial positions, azimuthal positions, radial distances, and radial velocities of points in the fifth cluster of points in Block S118.

Blocks of the method S100 recite: accessing a sixth frame captured by the second optical sensor in Block S112; isolating a sixth cluster of points representing a sixth static reference surface in the sixth frame in Block S116; and deriving a sixth absolute motion of the second optical sensor based on radial positions, azimuthal positions, radial distances, and radial velocities of points in the sixth cluster of points in Block S130.

Blocks of the method S100 recite: recording a third angular velocity of the mobile platform in Block S102; calculating a fourth angular velocity of the mobile platform based on the first absolute motion, the second absolute motion, the first rotational offset, and the first linear offset in Block S144; calculating a first angular velocity bias for the motion sensor based on a difference between the third angular velocity and the fourth angular velocity in Block S146; and storing the first angular velocity bias as a calibrated angular velocity bias for the motion sensor in Block S148.

In one variation, as shown in FIG. 5, once the autonomous vehicle calibrates angular and linear offsets between the first and second optical sensors, the autonomous vehicle can implement similar methods and techniques to calibrate the motion sensor, such as to correct angular velocity bias of the motion sensor, which may drift over time and may be sensitive to temperature changes. More specifically, the autonomous vehicle can leverage a previously-calibrated linear offset between the first and second optical sensors to correct an angular velocity bias of the motion sensor.

In one implementation, during a calibration period, the autonomous vehicle: captures a first frame via the first optical sensor in Block Silo; captures a second frame via the second optical sensor in Block S112; and records a nominal angular velocity $\omega_{IMU}$ of the autonomous vehicle via the motion sensor in Block S102. The autonomous vehicle then executes the foregoing methods and techniques to: isolate a first cluster of points representing a first static reference surface in the first frame in Block S114; derive a first absolute motion of the first optical sensor based on the radial positions, azimuthal positions, radial distances, and radial velocities of the first cluster of points in Block S118; isolate a second cluster of points representing a second static reference surface in the second frame in Block S116; and derive a second absolute motion of the second optical sensor based on the radial positions, azimuthal positions, radial distances, and radial velocities of the second cluster of points in Block S130.

In this implementation, in Block S144, the autonomous vehicle then solves for the true angular velocity $\omega_{true}$ in the function $$V_{sensor1} = R \cdot V_{sensor2} + \omega_{true} \times d$$

wherein $V_{sensor1}$ is the observed 3D motion (e.g., absolute velocity) of the first optical sensor, $V_{sensor2}$ is the observed 3D motion of the second optical sensor, R is the rotational offset between the first and second optical sensors previously calibrated in Block S132 described above, ω is the true rotation vector (e.g., angular velocity) of the autonomous vehicle during the current calibration period, and d is the displacement vector (e.g., linear offset, 3D Euclidean distance) between the first and second optical sensors previously calibrated in Block S142.

For example, the autonomous vehicle can: calculate a first value characterized by a product of the rotational offset and the absolute motion of the second optical sensor; calculate a second value characterized by a difference between the absolute motion of the first optical sensor and the first value; and calculate the true angular velocity based on a ratio between the second value and the linear offset, such as according to the function:

$$\omega_{true} = \frac{V_{sensor1} - R \cdot V_{sensor2}}{d}$$

The autonomous vehicle can then: calculate a difference between the nominal velocity $\omega_{IMU}$ and the true angular velocity $\omega_{true}$ of the autonomous vehicle during the calibration period in Block S146; and store this difference as a calibrated correction for angular velocity bias of the motion sensor in Block S148. Later, the autonomous vehicle can correct nominal angular velocities output by the motion sensor according to this stored difference.

In one implementation, the autonomous platform can: access a subsequent angular velocity of the autonomous vehicle (e.g., based on detected values of the motion sensor) in Block S102; access a third frame captured by the first optical sensor in Block S110; access a fourth frame captured by the second optical sensor in Block S112; and generate a composite frame based on the third frame, the fourth frame, the rotational offset, the linear offset, the subsequent angular velocity, and the calibrated angular velocity bias in Block S150.

Additionally, the autonomous vehicle can repeat the foregoing methods and techniques during angular velocity calibration cycles to iteratively refine the derived angular velocity bias of the motion sensor over multiple calibration periods. In one implementation, in Block S1108, the autonomous vehicle can initiate a calibration period (e.g., for calibrating an angular velocity bias of the motion sensor), such as in response to: detecting an angular velocity of the autonomous vehicle exceeding the minimum angular velocity; detecting a speed of the autonomous vehicle exceeding a threshold speed; and/or detecting a collision of the autonomous vehicle, as described above.

9. ERROR AND SENSITIVITY

Generally, calibration sensitivity for a particular rotational axis may be proportional to the span of the static reference surfaces in the fields of view of the first and second optical sensors orthogonal to this rotational axis. (That is, calibration error about the rotational axis may be inversely proportional to the span of static reference surfaces in the fields of view of the first and second optical sensors orthogonal to this rotational axis.)

For example, if the autonomous vehicle is navigating along a flat road with minimal vertical features (e.g., a desert road), the observed field of view of any reference surface along a vertical axis of an optical sensor on the autonomous vehicle may be relatively narrow. Accordingly, the calibration sensitivity of the set of optical sensors to rotation and linear offset about and along a pitch axis may be relatively low, and error of calibrated rotational and linear offsets about and along the pitch axis may be relatively high.

Therefore, the autonomous vehicle can selectively execute calibration routines according to the method when the autonomous vehicle detects static reference surfaces filling a relatively large proportion of the large vertical and horizontal spans of the fields of view of the optical sensors.

For example, the autonomous vehicle can automatically execute calibration routines according to the method when driving through a straight section of tunnel, such as based on a tunnel label in a localization map loaded on the autonomous vehicle or based on tunnel features detected in the fields of view of optical sensors on the autonomous vehicle. In particular, when occupying a tunnel, the autonomous vehicle can achieve high visibility of static reference surfaces (i.e., the road surface and tunnel walls) above, below, to each side of, partially ahead of, and partially behind the autonomous vehicle. In this example, the autonomous vehicle can: select road and tunnel surfaces—represented in concurrent frames captured by optical sensors on the autonomous vehicle—as reference surfaces for these optical sensors during a calibration period; and execute the foregoing Blocks of the method to calibrate a rotational offset between the optical sensors. Accordingly, the autonomous vehicle can achieve high calibration sensitivity and low error in relative pitch, yaw, and roll offsets between optical sensors on the autonomous vehicle based on motions of these optical sensors—relative to the tunnel and road surfaces—derived from radial velocities (e.g., Doppler shift values) of points representing these road and tunnel surfaces in frames captured by these optical sensors while the autonomous vehicle navigates through the tunnel.

11. MULTI-BODY VEHICLE

In one variation, the autonomous vehicle includes: a first vehicle element (e.g., a tractor); a second vehicle element (e.g., a trailer) pivotably coupled to the first vehicle element; a first set of optical sensors arranged on the first vehicle element; a second set of optical sensors arranged on the second vehicle element; a first motion sensor arranged on the first vehicle element; and a second motion sensor arranged on the second vehicle element.

In this variation, the autonomous vehicle can execute Blocks of the method S100 to: calibrate the angular and linear offsets between the first set of optical sensors on the first vehicle element based on frames captured by the first set of optical sensors and angular velocities detected by the first motion sensor; calibrate the angular and linear offsets between the second set of optical sensors on the second vehicle element based on frames captured by the second set of optical sensors and angular velocities detected by the second motion sensor; correct the angular velocity bias of the first motion sensor on the first vehicle element based on frames captured by the first set of optical sensors; and/or correct the angular velocity bias of the second motion sensor on the second vehicle element based on frames captured by the second set of optical sensors.

Later, when the corrected angular motions of the first and second motion sensors both indicate no (or nearly no) angular velocities, the autonomous vehicle can execute the foregoing methods and techniques to: capture a first frame via a first optical sensor on the first vehicle element; capture a second frame via a second optical sensor on the second vehicle element; record nominal angular velocities of the vehicle elements from the motion sensors; isolate a first cluster of points representing a first static reference surface in the first frame; and derive a first absolute motion of the first optical sensor based on the radial positions, azimuthal positions, radial distances, and radial velocities of the first cluster of points. The autonomous vehicle can further: isolate a second cluster of points representing a second static reference surface in the second frame; derive a second absolute motion of the second optical sensor based on the radial positions, azimuthal positions, radial distances, and radial velocities of the second cluster of points; and solve for the rotational offset between the first optical sensor on the first vehicle element and the second optical sensor on the second vehicle element.

Similarly, when the corrected angular motions of the first and second motion sensors agree (e.g., differ by less than a threshold angular velocity) and are non-zero, the autonomous vehicle can predict congruent motion of the first and second vehicle elements (e.g., that the first and second vehicle elements are turning as one continuous body). Accordingly, the autonomous vehicle can execute the foregoing methods and techniques to: capture a first frame via a first optical sensor on the first vehicle element; capture a second frame via a second optical sensor on the second vehicle element; record nominal angular velocities of the vehicle elements from the motion sensors; isolate a first cluster of points representing a first static reference surface in the first frame; and derive a first absolute motion of the first optical sensor based on the radial positions, azimuthal positions, radial distances, and radial velocities of the first cluster of points. The autonomous vehicle can further: isolate a second cluster of points representing a second static reference surface in the second frame; derive a second absolute motion of the second optical sensor based on the radial positions, azimuthal positions, radial distances, and radial velocities of the second cluster of points; and solve for the linear offset between the first optical sensor on the first vehicle element and the second optical sensor on the second vehicle element. Accordingly, the autonomous vehicle can track relative positions of optical sensors on the first and second vehicle elements—and thus track relative positions of the first and second vehicle elements—based on clusters of points representing static objects or surfaces in the fields of view of optical sensors on the first and second vehicle elements.

12. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for calibrating relative positions of optical sensors on a mobile platform, the method comprising, during a first calibration period:
   accessing a first frame captured by a first optical sensor on the mobile platform, the first frame comprising a first set of points containing radial positions, azimuthal positions, radial distances, and radial velocities relative to a first field of view of the first optical sensor;
   accessing a second frame captured by a second optical sensor on the mobile platform, the second frame comprising a second set of points containing radial positions, azimuthal positions, radial distances, and radial velocities relative to a second field of view of the second optical sensor;
   isolating a first cluster of points, in the first set of points, representing a first static reference surface in the first frame;
   isolating a second cluster of points, in the second set of points, representing a second static reference surface in the second frame;
   deriving a first absolute motion of the first optical sensor based on radial positions, azimuthal positions, radial distances, and radial velocities of points in the first cluster of points;
   deriving a second absolute motion of the second optical sensor based on radial positions, azimuthal positions, radial distances, and radial velocities of points in the second cluster of points;
   calculating a first rotational offset between the first optical sensor and the second optical sensor based on the first absolute motion and the second absolute motion; and
   storing the first rotational offset as a calibrated rotational offset between the first optical sensor and the second optical sensor.

2. The method of claim 1:
   further comprising initiating the first calibration period in response to detecting a first angular velocity of the mobile platform falling below a maximum angular velocity; and
   wherein calculating the first rotational offset comprises calculating the first rotational offset based on a ratio of the first absolute motion and the second absolute motion.

3. The method of claim 2, wherein initiating the first calibration period comprises initiating the first calibration period in response to:
   detecting a collision of the mobile platform; and
   detecting the first angular velocity of the mobile platform falling below a maximum angular velocity.

4. The method of claim 1, further comprising, during a second calibration period:
   accessing a second angular velocity of the mobile platform;
   accessing a third frame captured by the first optical sensor, the third frame comprising a third set of points containing radial positions, azimuthal positions, radial distances, and radial velocities relative to the first field of view of the first optical sensor;
   accessing a fourth frame captured by the second optical sensor, the fourth frame comprising a fourth set of points containing radial positions, azimuthal positions, radial distances, and radial velocities relative to the second field of view of the second optical sensor;
   isolating a third cluster of points, in the third set of points, representing a third static reference surface in the third frame;
   isolating a fourth cluster of points, in the fourth set of points, representing a fourth static reference surface in the fourth frame;
   deriving a third absolute motion of the first optical sensor based on radial positions, azimuthal positions, radial distances, and radial velocities of points in the third cluster of points;
   deriving a fourth absolute motion of the second optical sensor based on radial positions, azimuthal positions, radial distances, and radial velocities of points in the fourth cluster of points;
   calculating a first linear offset between the first optical sensor and the second optical sensor based on the third absolute motion, the fourth absolute motion, the first rotational offset, and the second angular velocity of the mobile platform; and
   storing the first linear offset as a calibrated linear offset between the first optical sensor and the second optical sensor.

5. The method of claim 4, wherein calculating the first linear offset comprises:
- calculating a first value characterized by a product of the first rotational offset and the fourth absolute motion;
- calculating a second value characterized by a difference between the third absolute motion and the first value; and
- calculating the first linear offset based on a ratio between the second value and the second angular velocity.

6. The method of claim 4, further comprising initiating the second calibration period in response to detecting the second angular velocity of the mobile platform exceeding a minimum angular velocity.

7. The method of claim 4, further comprising, during a third calibration period:
- recording a third angular velocity of the mobile platform;
- accessing a fifth frame captured by the first optical sensor;
- accessing a sixth frame captured by the second optical sensor;
- isolating a fifth cluster of points representing a fifth static reference surface in the fifth frame;
- isolating a sixth cluster of points representing a sixth static reference surface in the sixth frame;
- deriving a fifth absolute motion of the first optical sensor based on radial positions, azimuthal positions, radial distances, and radial velocities of points in the fifth cluster of points;
- deriving a sixth absolute motion of the second optical sensor based on radial positions, azimuthal positions, radial distances, and radial velocities of points in the sixth cluster of points;
- calculating a fourth angular velocity of the mobile platform based on the first absolute motion, the second absolute motion, the first rotational offset, and the first linear offset;
- calculating a first angular velocity bias for the motion sensor based on a difference between the third angular velocity and the fourth angular velocity; and
- storing the first angular velocity bias as a calibrated angular velocity bias for the motion sensor.

8. The method of claim 1, further comprising, during a time period succeeding the first calibration period:
- accessing a third frame captured by the first optical sensor;
- accessing a fourth frame captured by the second optical sensor; and
- generating a composite frame based on the third frame, the fourth frame, and the first rotational offset.

9. The method of claim 1, wherein accessing the first frame comprises accessing the first frame captured by the first optical sensor comprising a four-dimensional light detection and ranging sensor:
- mounted on the autonomous vehicle; and
- configured to generate frames representing positions and speeds of surfaces within the first field of view.

10. The method of claim 1, wherein isolating the first cluster of points representing the first static reference comprises isolating the first cluster of points that are:
- clustered at similar depths from the autonomous vehicle; and
- tagged with radial velocities self-consistent for a contiguous object.

11. The method of claim 1, wherein isolating a first cluster of points, in the first set of points, representing a first static reference surface in the first frame comprises isolating the first cluster of points that:
- approximate a planar surface represented by a normal vector nonparallel to an axis of rotation of the first optical sensor;
- fall within a threshold distance of the mobile platform; and
- occupy lowest positions within the first frame.

12. The method of claim 1, wherein deriving the first absolute motion of the first optical sensor comprises:
- calculating a first correlation between radial velocities and azimuthal positions of points in the first cluster of points;
- based on the first correlation, calculating a first function relating a first set of combinations of possible tangential velocities of the first optical sensor and possible angular velocities of the first optical sensor coherent with radial velocities of the first cluster of points;
- calculating a total radial velocity of the first optical sensor based on radial velocities of points in the first cluster of points; and
- estimating a first tangential velocity of the first optical sensor based on the total radial velocity of the first optical sensor and the first function.

13. The method of claim 12, wherein deriving the first absolute motion of the first optical sensor comprises:
- accessing a third frame captured by the first optical sensor;
- isolating a third cluster of points representing the first static reference surface in the third frame;
- calculating a second correlation between radial velocities and azimuthal positions of points in the third cluster of points;
- based on the second correlation, calculating a second function relating a second set of combinations of possible tangential velocities of the first optical sensor and possible angular velocities of the first optical sensor coherent with radial velocities of the third cluster of points; and
- estimating a second tangential velocity of the first optical sensor based on an intersection of the first function and the second function.

14. A method for calibrating a motion sensor on a mobile platform, the method comprising, during a first calibration period:
- recording a first angular velocity of the mobile platform by the motion sensor;
- accessing a first frame captured by a first optical sensor on the mobile platform;
- accessing a second frame captured by a second optical sensor on the mobile platform;
- isolating a first cluster of points representing a first static reference surface in the first frame;
- isolating a second cluster of points representing a second static reference surface in the second frame;
- deriving a first absolute motion of the first optical sensor based on radial positions, azimuthal positions, radial distances, and radial velocities of points in the first cluster of points;
- deriving a second absolute motion of the second optical sensor based on radial positions, azimuthal positions, radial distances, and radial velocities of points in the second cluster of points;
- accessing a first rotational offset between the first optical sensor and the second optical sensor;
- accessing a first linear offset between the first optical sensor and the second optical sensor;

calculating a second angular velocity of the mobile platform based on the first absolute motion, the second absolute motion, the first rotational offset, and the first linear offset;
calculating a first angular velocity bias for the motion sensor based on a difference between the first angular velocity and the second angular velocity; and
storing the first angular velocity bias as a calibrated angular velocity bias for the motion sensor.

15. The method of claim 14, wherein calculating the second angular velocity comprises:
calculating a first value characterized by a product of the first rotational offset and the fourth absolute motion;
calculating a second value characterized by a difference between the third absolute motion and the first value; and
calculating the second angular velocity based on a ratio between the second value and the first linear offset.

16. The method of claim 14, further comprising, during a time period succeeding the first calibration period:
accessing a third angular velocity of the mobile platform;
accessing a third frame captured by the first optical sensor;
accessing a fourth frame captured by the second optical sensor; and
generating a composite frame based on the third frame, the fourth frame, the first rotational offset, the first linear offset, the third angular velocity, and the first angular velocity bias.

17. The method of claim 14, further comprising, during a second calibration period succeeding the first calibration period:
accessing a third frame captured by the first optical sensor, the third frame comprising a third set of points containing radial positions, azimuthal positions, radial distances, and radial velocities relative to the first field of view of the first optical sensor;
accessing a fourth frame captured by the second optical sensor, the fourth frame comprising a fourth set of points containing radial positions, azimuthal positions, radial distances, and radial velocities relative to the second field of view of the second optical sensor;
isolating a third cluster of points, in the third set of points, representing a third static reference surface in the first frame;
isolating a fourth cluster of points, in the fourth set of points, representing a fourth static reference surface in the second frame;
deriving a third absolute motion of the first optical sensor based on radial positions, azimuthal positions, radial distances, and radial velocities of points in the third cluster of points;
deriving a fourth absolute motion of the second optical sensor based on radial positions, azimuthal positions, radial distances, and radial velocities of points in the fourth cluster of points; and
calculating a second rotational offset between the first optical sensor and the second optical sensor based on the third absolute motion and the fourth absolute motion.

18. The method of claim 17, further comprising initiating the second calibration period in response to detecting expiration of a threshold duration of time succeeding a prior calibration period in which the first rotational offset is calculated.

19. The method of claim 17, further comprising, in response to detecting a third angular velocity of the mobile platform during the second calibration period falling below a fourth angular velocity of the mobile platform during the prior calibration period, storing the second rotational offset as a calibrated rotational offset between the first optical sensor and the second optical sensor.

* * * * *